(12) United States Patent
Armstrong et al.

(10) Patent No.: US 6,225,985 B1
(45) Date of Patent: May 1, 2001

(54) ACOUSTIC TOUCHSCREEN CONSTRUCTED DIRECTLY ON A CATHODE RAY TUBE

(75) Inventors: Donald B. Armstrong, Belmont; Joel Kent; James Roney, both of Fremont, all of CA (US)

(73) Assignee: Elo TouchSystems, Inc., Fremont, CA (US)

( * ) Notice: Subject to any disclaimer, the term of this patent is extended or adjusted under 35 U.S.C. 154(b) by 0 days.

(21) Appl. No.: 09/277,571

(22) Filed: Mar. 26, 1999

(51) Int. Cl.$^7$ ........................................................ G09G 5/00
(52) U.S. Cl. ............................................. 345/177; 345/173
(58) Field of Search .................................. 345/177, 173; 367/153, 154, 155

(56) References Cited

U.S. PATENT DOCUMENTS 6,078,315 * 6/2000 Huang .................................... 345/177
6,091,406 * 7/2000 Kambara et al. ..................... 345/177

* cited by examiner

Primary Examiner—Richard A. Hjerpe
Assistant Examiner—Ronald Laneau

(57) ABSTRACT

A touchscreen is constructed directly on the glass surface of a cathode ray tube (CRT). To solve the problem of insufficient space between the CRT's bezel and frontal region to accommodate the transducers for the touchscreen, the transducers are moved away from the frontal region, to the highly curved shoulder region of the CRT. To preserve acoustic signal strength, the positioning of the transducers is chosen to take advantage of the fact that an acoustic wave on a non-Euclidean surface travels along a geodesic path. Allowance is also made for the acoustic lens and prism effect of the corner regions of the CRT, where the transducer may be located.

42 Claims, 7 Drawing Sheets

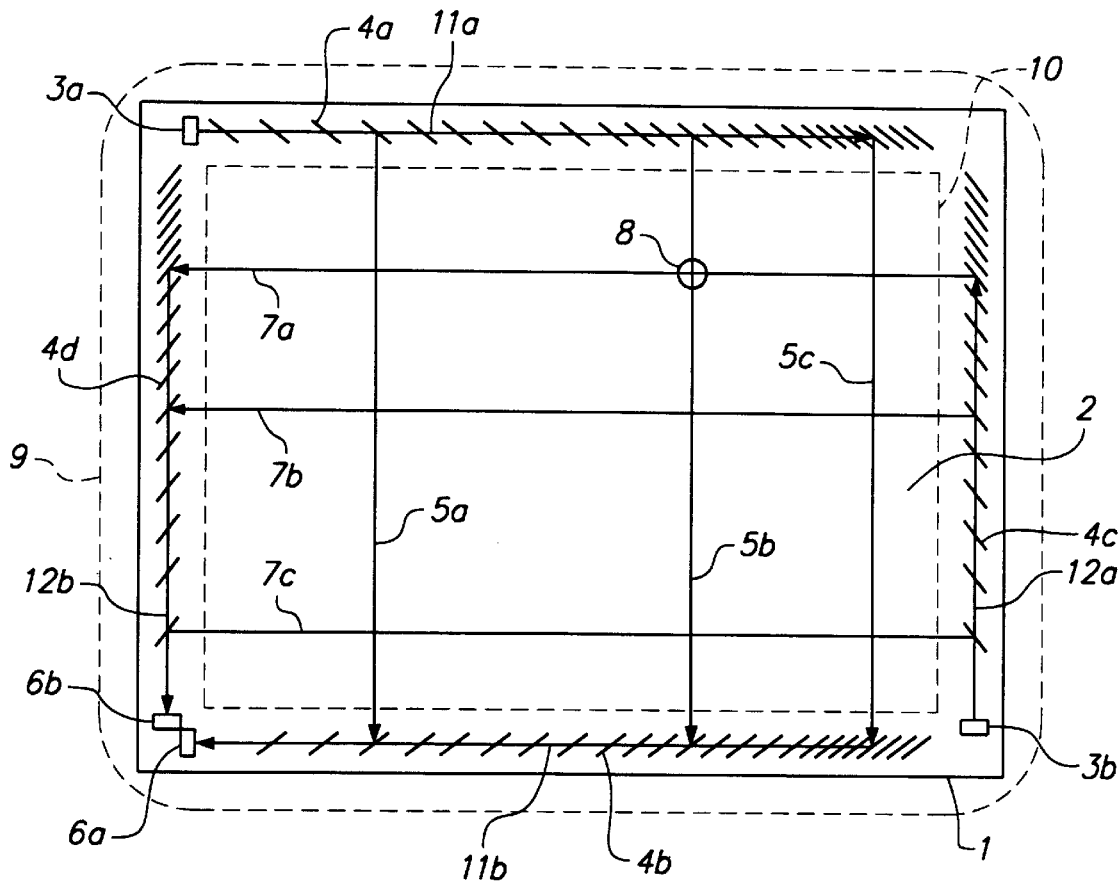
FIG. 1 *(PRIOR ART)*
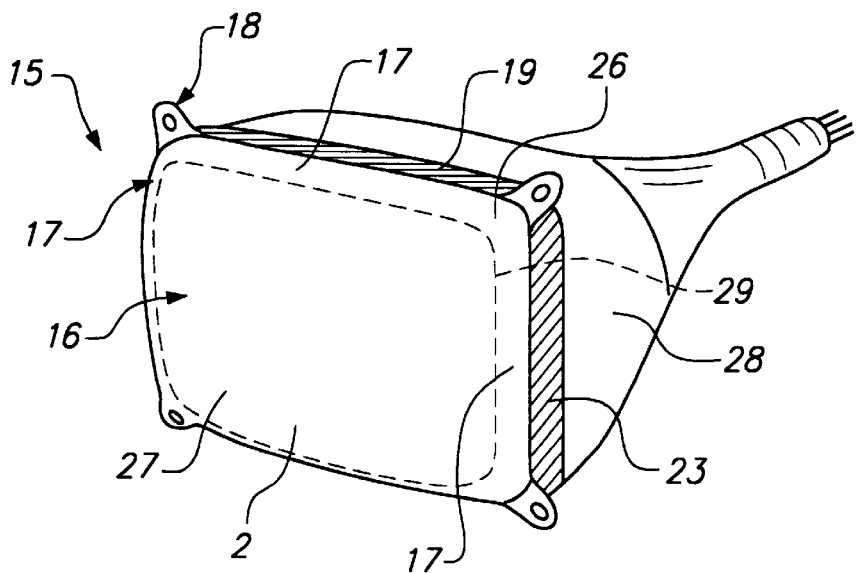
FIG. 2A *(PRIOR ART)*

ACOUSTIC TOUCHSCREEN CONSTRUCTED DIRECTLY ON A CATHODE RAY TUBE

BACKGROUND OF THE INVENTION

1. Field of the Invention

This invention relates to an acoustic touchscreen constructed directly on a cathode ray tube, and methods therefor.

2. Description of Related Art

An acoustic touchscreen has a touch-sensitive area on which the occurrence and location of a touch is sensed via the touch's effect on the transmission of acoustic waves thereacross. A common type of acoustic touchscreen employs Rayleigh waves (a term which, as used herein, subsumes quasi-Rayleigh waves). Illustrative disclosures relating to Rayleigh wave touchscreens include Adler, U.S. Pat. No. 4,642,423 (1987); U.S. Pat. No. 4,645,870 (1987); U.S. Pat. No. 4,700,176 (1987); U.S. Pat. No. 4,746,914 (1988) (hereinafter "Adler '914"); U.S. Pat. No. 4,791,416 (1988); and Re 33,151 (1990); Adler et al., U.S. Pat. No. 4,825,212 (1989); U.S. Pat. No. 4,859,996 (1989); and U.S. Pat. No. 4,880,665 (1989); Brenner et al., U.S. Pat. No. 4,644,100 (1987); Davis-Cannon et al., U.S. Pat. No. 5,739,479 (1998); and Kent, U.S. Pat. No. 5,708,461 (1998) and U.S. Pat. No. 5,854,450 (1998). Acoustic touchscreens employing other types of acoustic waves such as Lamb or shear waves, or combinations of different types acoustic waves (including combinations involving Rayleigh waves) are also known, illustrative disclosures including Kent, U.S. Pat. No. 5,591,945 (1997) and U.S. Pat. No. 5,854,450 (1998); Knowles, U.S. Pat. No. 5,072,427 (1991); U.S. Pat. No. 5,162,618 (1992); U.S. Pat. No. 5,177,327 (1993); U.S. Pat. No. 5,243,148 (1993); U.S. Pat. No. 5,329,070 (1994); and U.S. Pat. No. 5,573,077; and Knowles et al., U.S. Pat. No. 5,260,521 (1993). The documents cited in this paragraph are incorporated herein by reference.

FIG. 1 illustrates the operation of a typical acoustic touchscreen 1, having an active, or touch-sensitive area 2. A first transmitting transducer 3a is positioned outside of touch-sensitive area 2, acoustically coupled to the surface of touchscreen 1, and sends an acoustic signal in the form of an acoustic wave 11a traveling parallel to the top edge of touchscreen 1 and generally in the plane of touchscreen 1. Aligned in the transmission path of acoustic wave 11a is a linear array of partially acoustically reflective elements 4a, each of which partially reflects (by approximately 90°) and partially transmits the acoustic signals, creating a plurality of acoustic waves (exemplarily 5a, 5b, and 5c) traveling vertically (parallel to the Y-axis) across touch-sensitive area 2. (The spacing of reflective elements 4a is variable to compensate for the attenuation of the acoustic signals with increasing distance from first transmitter 3a.) Acoustic waves 5a, 5b, and 5c, upon reaching the lower edge of touchscreen 1, are again reflected by approximately 90° (arrow 11b) by another linear array of similarly partially acoustically reflective elements 4b towards a first receiving transducer 6a, where they are detected and converted to electrical signals for data processing. Along the left and right edges of touchscreen 1 are located a similar arrangement. A second transmitting transducer 3b generates an acoustic wave 12a along the left edge, and a linear array of partially acoustically reflective elements 4c creates therefrom a plurality of acoustic waves (exemplarily 7a, 7b, and 7c) traveling horizontally (parallel to the X-axis) across touch-sensitive area 2. Acoustic waves 7a, 7b, and 7c are redirected (arrow 12b) by yet another linear array of partially acoustically reflective elements 4d towards receiving transducer 6b, where they are also detected and converted to electrical signals.

If touch-sensitive area 2 is touched at position 8 by an object such as a finger or a stylus, some of the energy of the acoustic waves 5b and 7a is absorbed by the touching object. The resulting attenuation is detected by receiving transducers 6a and 6b as a perturbation in the acoustic signal. Analysis of the data with the aid of a microprocessor (not shown) allows determination of the coordinates of position 8.

Those skilled in the art will appreciate that it is not essential to have two sets of transmitting/receiving transducers to make a touchscreen. The device of FIG. 1, without one set of transducers, will still function as a touchscreen, detecting the occurrence of a touch and providing limited location information (one of the coordinates). Or, a touchscreen can be designed with only two transducers by using a common transmit/receive transducer scheme, as disclosed in Adler '914 (FIG. 8).

In normal usage a housing 9, typically made of molded polymer, is associated with touchscreen 1. Housing 9 contains a bezel 10 that overlays touchscreen 1, concealing the transmitting and receiving transducers, the reflective elements, and other components, but exposing touch-sensitive area 2. This arrangement protects the concealed components from contamination and/or damage, presents a more aesthetically pleasing appearance, and defines the touch-sensitive area for the user.

A touchscreen may comprise a separate faceplate (typically made of glass, but other hard substrates may be used) overlaid on a display panel such as a cathode ray tube (CRT), a liquid crystal display (LCD), plasma, electroluminescent, or other type of display. Alternatively it has been proposed to construct a touchscreen directly on the glass surface of a CRT, so that the CRT surface is the touch-sensitive surface, Adler '914 discloses such a construction. A direct-on-CRT touchscreen construction is desirable because it eliminates a piece of glass or other material between the viewer and the CRT, increasing the perceived display brightness. Also, there are economic advantages in dispensing with the overlay glass and not having to modify CRT chassis to make room for the overlay glass.

FIG. 2a shows a conventional CRT 15 on which a touchscreen may be constructed. CRT 15 comprises two glass sections, a rear tapering section referred to as a funnel 28 and, in front thereof, a panel 27. In turn, panel 27 includes a substantially rectangular frontal region 16 on which an image is displayed and which, if a touchscreen is installed, also serves as touch-sensitive area 2. Ancillary features include mounting ears 18 for attaching the housing (not shown) and a protective steel implosion band 23.

Frontal region 16 typically is not truly flat, but curved to an extent varying from CRT to CRT, with the more expensive CRT's tending to be less curved. But, for general purposes and also for the purposes of this invention, frontal region 16 may be considered to be substantially planar and defining a plane. Panel 27 further has, outside of the viewing area (and the touch-sensitive area, if a touchscreen has been installed) and below frontal region 16, a shoulder region 17 where the glass curves down and away from the plane of frontal region 16. Shoulder region 17 includes corner regions 26 having complex non-Euclidean topography, at the confluences of the corners of frontal region 16 and shoulder region 17. The degree of curvature of CRT 15's glass surface in shoulder region 17 (including corner regions 26) may be quite high, compared to that of frontal region 16. The radius of curvature of frontal region 16 may be on the order of 50 centimeters or more, while shoulder region 17 may have much smaller radii of curvature, on the order of a few centimeters. Thus, transition 29 from frontal region 16 to shoulder region 17 may be defined as occurring where there is a sharp discontinuity (decrease) in the radius of curvature of the glass surface. If frontal region 16 is treated as being substantially planar, the plane perpendicular to the axis of the CRT and intersecting this discontinuity may be considered to be its plane.

In building a direct-on-CRT touchscreen, the touchscreen manufacturer normally does not manufacture the CRT itself. Rather, the manufacturer works with the CRT as supplied by a monitor manufacturer (or, in the case of a monitor integrated with a computer CPU chassis, such as the iMac computer from Apple Computer, from the computer manufacturer). Since it is often impractical for the touchscreen manufacturer to replace the supplied housing with a new housing, the manufacturer must adapt to whatever space is available between the supplied housing and the CRT for accommodating the touchscreen elements such as the transmitting and receiving transducers (collectively referred to as transducers) and the reflective elements. Even where the touchscreen manufacturer has design control over the bezel, mechanical interference with the transducers often force a reduction in the dimensions of the bezel opening that prevents one from utilizing the full available display area of the CRT.

Conventionally, touchscreen components are placed on the frontal region. FIG. 2b is a frontal view of the CRT 15 of FIG. 2a having transmitting and receiving transducers 3a, 3b, 6a and 6b and arrays of reflective elements 4a, 4b, 4c, and 4d mounted thereon, on frontal region 16 thereof. (A like arrangement is shown in FIG. 1 of Adler '914.)

Normally, there is sufficient clearance for the reflective elements, which have a low profile. However, installation of the transducers is a more difficult proposition, due to their higher profile. This problem is illustrated in FIG. 3. (Dotted line 13 denotes the plane of frontal region 16.) When housing 9 is mounted on CRT 15 (i.e., moves in the direction indicated by arrow A), there is mechanical interference between bezel 10 and transducer 4. This interference may impede the proper functioning of transducer 4 or, worse yet, 30 damage either transducer 4 or bezel 10. Sometimes it is possible to create sufficient clearance by carving out a small amount of bezel material, but such a solution is not generically applicable and is anyway undesirable and/or impractical for a variety of reasons. The carving-out is a slow, labor-intensive operation; the bezel may be weakened and rendered susceptible to damage in subsequent use; and the carved out region may be visible, especially if the housing is made of translucent or transparent material.

Reference is also made to Davis-Cannon et al., U.S. Pat. No. 5,739,479 (1998), which discloses an acoustic touchscreen containing the transducers recessed on a beveled portion of the touchscreen. However, the invention there may not be applicable for a manufacturer installing touchscreens directly on a CRT surface, as conventional CRT's do not have such beveling. Reference is additionally made to Kambara et al., WO 98/29853 (1998), which discloses grating transducers for acoustic touchscreens. However, the piezoelectric elements of grating transducers must be placed on the underside of the touchscreen, an option not available for a direct-on-CRT construction.

Thus, it is desirable to develop a direct-on-CRT touchscreen construction which is compatible with tight clearances available between a CRT and its bezel and is adaptable for use with CRT's and housings as received from the CRT-monitor supplier, or which allows custom bezel designs maximizing the use of the CRT's display area.

BRIEF SUMMARY OF THE INVENTION

Accordingly, there is provided an acoustic touchscreen constructed directly on a CRT, comprising:
(a) a CRT comprising
  (i) a substantially rectangular frontal region having four corners and
  (ii) a shoulder region below the frontal region, including four corner regions at the confluences of the shoulder region and the corners of the frontal region;
(b) a first transducer acoustically coupled to the surface of the CRT and capable of generating an acoustic signal thereon;
(c) a first linear array of partially acoustically reflective elements associated with the first transducer, the first linear array being disposed on the frontal region, being capable of deflecting the acoustic signal across the frontal region, and having a longitudinal array axis;
(d) a second transducer acoustically coupled to the surface of the CRT and capable of detecting the acoustic signal after the acoustic signal has traveled across the frontal region, together with perturbations thereto caused by a touch on the frontal region; and
(e) a second linear array of partially acoustically reflective elements associated with the second transducer, the second linear array being disposed on the frontal region, being capable of deflecting the acoustic signal towards the second transducer after the acoustic signal has traveled across the frontal region, and having a longitudinal array axis;
the first and second transducers being located on the shoulder region, each positioned on and aimed along the geodesic defined by the longitudinal array axis of the respective associated linear array.

In another embodiment of the invention, there is provided an acoustic touchscreen constructed directly on a CRT, comprising:
(a) a CRT comprising;
  (i) a substantially rectangular frontal region having four corners and
  (ii) a shoulder region below the frontal region, including four corner regions at the confluences of the shoulder region and the corners of the frontal region;
(b) first and second transducers, each acoustically coupled to the surface of the CRT and capable of generating respective first and second acoustic signals on the surface of the CRT;
(c) first and second linear arrays of partially acoustically reflective elements associated with the first and second transducers respectively, for deflecting the first and second acoustic signals, respectively, across the frontal region; each of the first and second linear arrays having a respective longitudinal array axis; the first linear array being disposed along a first edge of the frontal region and the second linear array being disposed along a second edge of the frontal region substantially orthogonal to the first edge;
(d) third and fourth transducers, each acoustically coupled to the surface of the CRT; the third transducer being capable of detecting the first acoustic signal after the first acoustic signal has traveled across the frontal region, together with perturbations thereto caused by a touch on the frontal region; the fourth transducer being capable of detecting the second acoustic signal after the second acoustic signal has traveled across the frontal region, together with perturbations thereto caused by a touch on the frontal region; and (e) third and fourth linear arrays of partially acoustically reflective elements associated with the third and fourth transducers respectively, for deflecting the first and second acoustic signals towards the third and fourth transducers, respectively, after the first and second acoustic signals have traveled across the frontal region; each of the third and fourth linear arrays having a respective longitudinal array axis; the third linear array being disposed along a third edge of the frontal region opposite the first edge thereof and the fourth linear array being disposed along a fourth edge of the frontal region opposite the second edge thereof;

the first, second, third and fourth transducers being located on the shoulder region, positioned on and aimed along the geodesic defined by the longitudinal array axis of the respective associated linear array.

In a third embodiment of the invention, there is provided a method of constructing a touchscreen directly on a CRT, comprising the steps of:

(a) providing a CRT comprising
   (i) a substantially rectangular frontal region having four corners and
   (ii) a shoulder region below the frontal region, including four corner regions at the confluences of the shoulder region and the corners of the frontal region;
(b) providing plural transducers;
(c) forming, on the frontal region, plural linear arrays of partially acoustically reflective elements, each linear array associated with a respective one of the plural transducers, each linear array having a respective longitudinal array axis;
(d) determining, for each linear array, the geodesic defined by the respective longitudinal array axis; and
(e) for each geodesic so determined, acoustically coupling the respective associated transducer to the surface of the CRT on the shoulder region, positioned on and aimed along the geodesic.

In a fourth embodiment of the invention, there is provided a method of situating a transducer for a touchscreen constructed directly on a CRT, comprising the steps of:

(a) providing a CRT comprising
   (i) a substantially rectangular frontal region having four comers and
   (ii) a shoulder region below the frontal region, including four comer regions at the confluences of the shoulder region and the comers of the frontal region; the CRT further having formed thereon a linear array of partially acoustically reflective elements, the linear array having a longitudinal array axis;
(b) determining the geodesic defined by the longitudinal array axis;
(c) providing a transducer;
(d) positioning the transducer on and aimed along the geodesic, on the surface of the CRT on the shoulder region; and
(e) acoustically coupling the transducer to the surface of the CRT, positioned and aimed according to the preceding step.

BRIEF DESCRIPTION OF THE DRAWING(S)

FIG. 1 shows a conventional acoustic touchscreen.

FIG. 2a shows, in perspective view, a conventional CRT on which a touchscreen ay be installed.

FIGS. 8a, 8b, 8c, and 8d are a theoretical constructs of the topography of the CRT glass surface, for explaining the lensing effect we have discovered.

FIGS. 9a, 9b, 9c, and 9d show schematically how a corner region may act as an acoustic lens and the resultant effect on acoustic waves.

Figure 10:
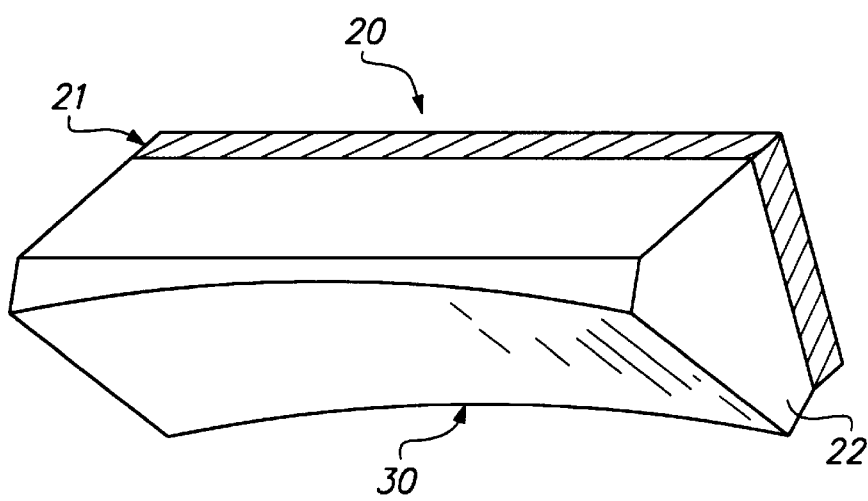

FIG. 10 shows a wedge transducer having a curved bottom surface, adapted for mounting on a glass surface which is not flat.

In this specification, numerals repeated from one figure to another denote the same or equivalent elements.

DETAILED DESCRIPTION OF THE INVENTION

Figure 4:
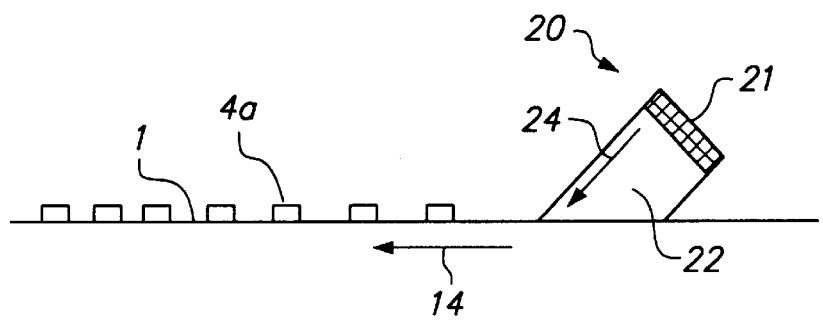
FIG. 4 shows a wedge transducer typically used in acoustic touchscreens.

Transducers typically used in acoustic touchscreens are wedge transducers, such as disclosed in Davis-Cannon et al., U.S. Pat. No. 5,739,479 (1998), incorporated herein by reference. This specification accordingly is written with particular reference to wedge transducers, although the use of our invention is not limited to wedge transducers. Other transducers may be used, such as interdigital transducers, as shown in FIG. 4 of Kent, U.S. Pat. No. 5,708,461 (1998), incorporated herein by reference. FIG. 4 herein shows a cross-sectional view of a wedge transducer 20 located on the surface of a touchscreen 1 and having as constituent parts a piezoelectric element 21 and a coupling wedge 22, made of a plastic such as poly(methyl methacrylate) (PMMA). Wedge 22 is adhesively bonded to the surface of touchscreen 1 by, for example, an UV curable adhesive, thereby acoustically coupling one to the other. Piezoelectric element 21 is mounted to a backside of coupling wedge 22 and is electrically connected to control electronics by electrodes (not shown). In response to an electrical signal, piezoelectric element 21 vibrates to produce a pressure wave 24 that propagates across wedge 22 and in turn is transduced through the wedge 22-touchscreen 1 interface as a quasi-Raleigh acoustic wave 14 propagating generally along the plane of touchscreen 1. Wave 14 may then be partially deflected by reflective elements 4a.

Thus, the conventional wisdom is that transducer 20 should be positioned in the plane of the touchscreen, or no more than moderately inclined with respect thereto. But such positioning may not be feasible for a direct-on-CRT, for the reasons explained above. In solving this problem, we have discovered that it is possible to locate the transducers not on the frontal region, but on the shoulder region of the CRTf—i.e., more or less on the side of the CRT—provided location parameters we have discovered are followed.

Figure 5:
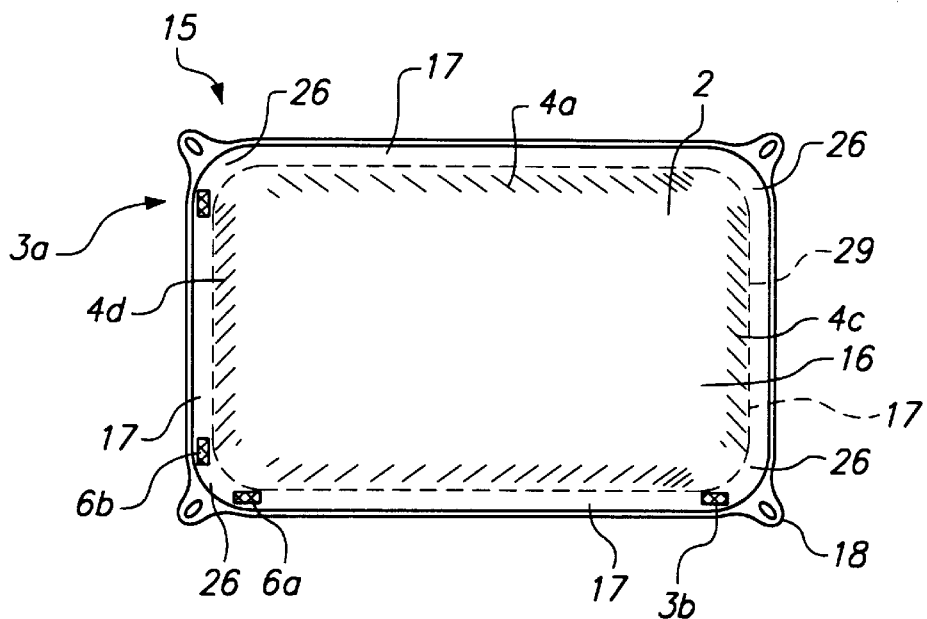
FIG. 5 shows a CRT having touchscreen components installed according to this invention.
Figure 6:
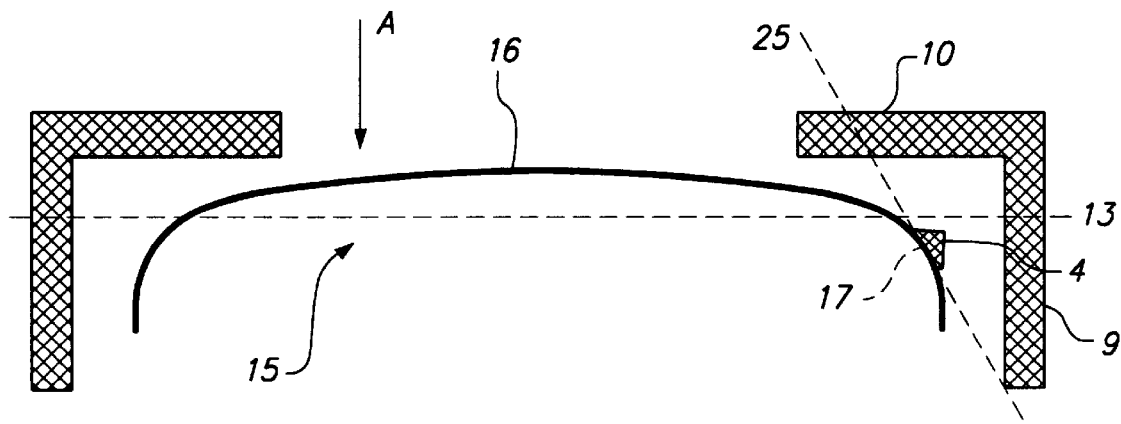
FIG. 6 is a cross-section schematic view showing the positioning of a transducer according to this invention.

A direct-on-CRT construction according to our invention is shown in FIG. 5. A feature of our invention is positioning of the transmitting and receiving transducers 3a, 3b, 6a, and 6b on shoulder region 17, as opposed to frontal region 16. Because shoulder region 17 slopes away from frontal region 16, sometimes precipitously, the transducers are positioned below the plane of frontal region 16 and do not mechanically interfere with a bezel (not shown in this figure) when it comes down on CRT 15. FIG. 6 is a cross-section view showing schematically how such positioning avoids mechanical interference between transducer 4 and bezel 10.

Figure 2B:
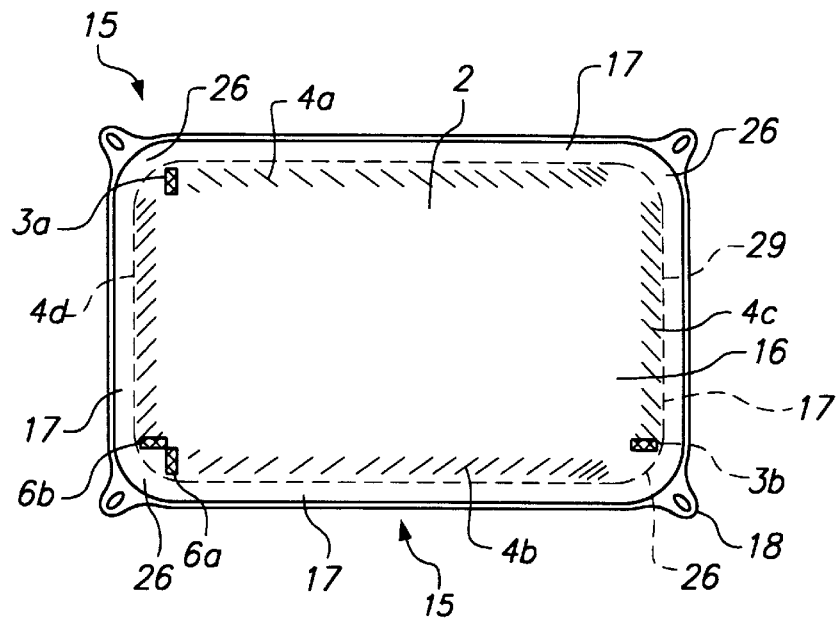
FIG. 2b shows, in a frontal view, the CRT of FIG. 2a with acoustic touchscreen components installed thereon in a conventional manner.
Figure 3:
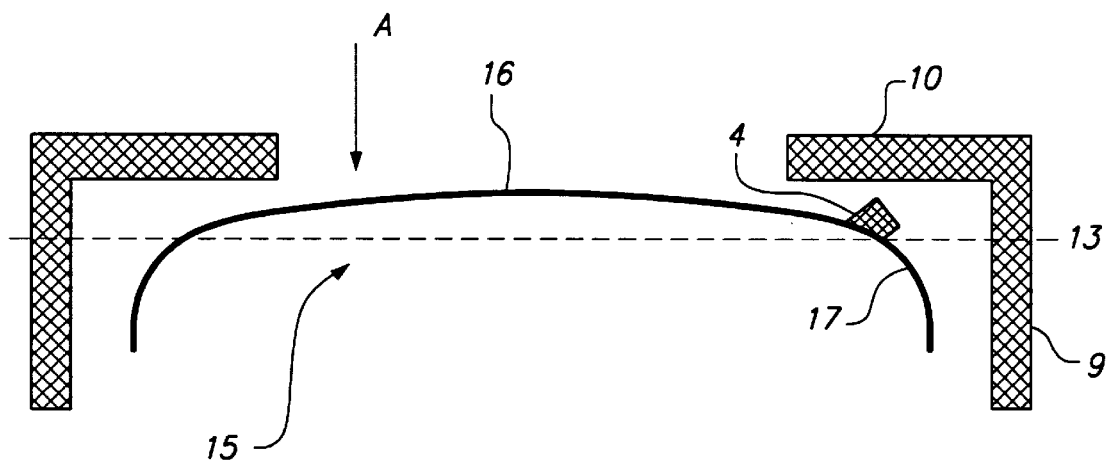
FIG. 3 is a schematic cross-sectional view of a curved CRT frontal region and a bezel, with a transducer on the frontal region.

It is not sufficient to merely place a transducer on a shoulder region. Consider a transmitting transducer placed there. The acoustic wave it generates initially will be aimed within the local plane of the glass surface to which the transducer is attached. Unlike the instance of a transducer located on the touchscreen plane (e.g., FIG. 2b) or on a beveled portion of the touchscreen (e.g., Davis-Cannon et al., U.S. Pat. No. 5,739,479 (1998)), this initial plane (indicated by line 25 in FIG. 6) will be highly inclined with respect to the plane of frontal region 16 (line 13 in FIG. 6). Without some method of efficiently acoustically connecting the transmitting transducer and the linear array located on the frontal region, the touchscreen will not function or will function poorly, due to high acoustic energy loss.

Figure 7A:
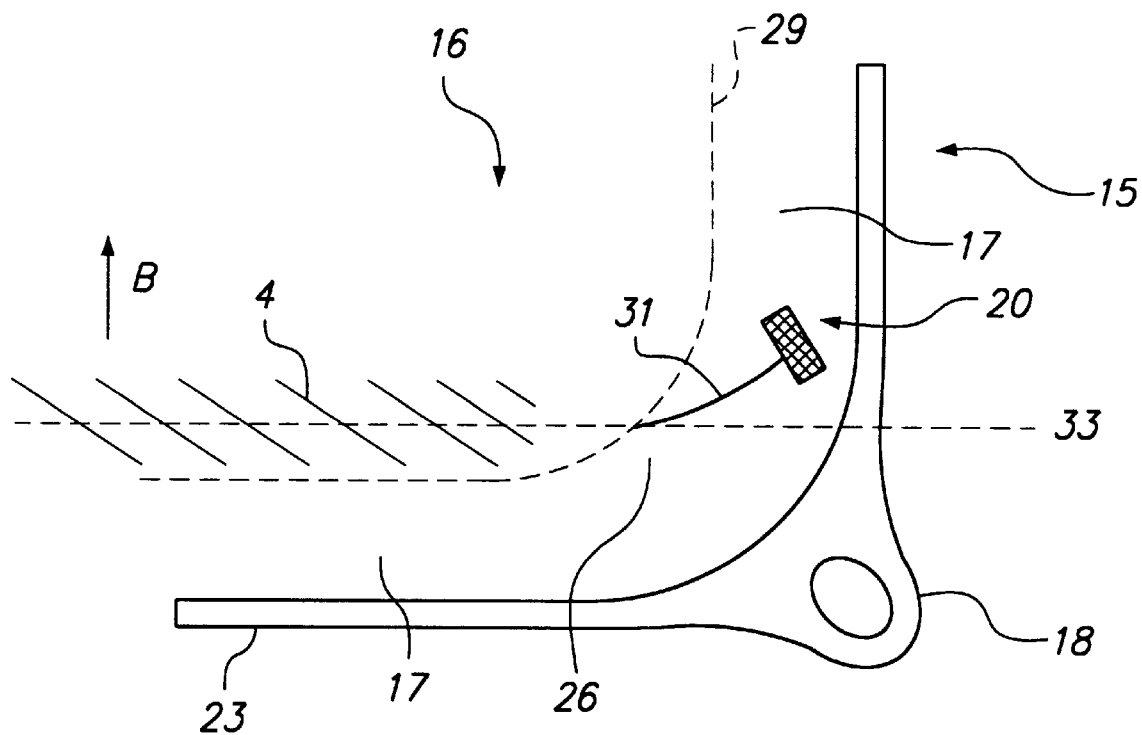
FIG. 7a is a partial plan view a direct-on-CRT construction showing positioning of a transducers along a geodesic.

An efficient acoustic connection can be established by taking advantage of the fact that an acoustic wave traveling on a non-Euclidean surface such as the CRT glass surface follows a geodesic (for example, a great circle route on a spherical surface). See, for instance, FIG. 20 in Kent, U.S. Pat. No. 5,854,450 (1998), incorporated herein by reference. By positioning the transducer at a location calculated to take advantage of this fact, we can move the transducers below the plane of the frontal region but yet maintain acoustic efficiency—i.e., have an acceptable amount of the acoustic energy generated by the transmitting transducers sensed by the receiving transducers, as opposed to having such energy dissipated. This positioning is illustrated in FIG. 7a. Transducer 20 is placed such that it is along a geodesic 31 defined by the longitudinal array axis 33. On frontal region 16 geodesic 31 substantially tracks axis 33, because frontal region 16 is quasi-planar. But, when geodesic 31 crosses transition 29 and reaches the highly curved surface of shoulder region 17, it curls away from axis 33. Transducer 20 should be placed on shoulder region 17, along geodesic 31. Transducer 20 is aimed along geodesic 31, instead of along longitudinal axis 33 as taught in the prior art (compare FIG. 7a against FIGS. 1 and 2b). That is, transducer 20 is tilted with respect to axis 33. The aim of transducer 20 (the direction of propagation of an acoustic signal generated by it) is perpendicular to the width of transducer 20's piezoelectric element. Because we are here talking about an infinitely thin theoretical line (geodesic 31) and a very small part (transducer 20) which is difficult to position with absolute precision, transducer 20 is said to be on geodesic 31 if any part of transducer 20 lies on geodesic 31. Thus, constructions in which transducer 20 is not perfectly positioned, but is somewhat off-center, so that, for example, only an upper (or lower) corner thereof intercepts geodesic 31 are within the scope of this invention. Similarly, transducer 20 is said to be aimed along geodesic 31 if it is aimed generally in such direction; it is not necessary that the aim be mathematically exact.

Figure 7B:
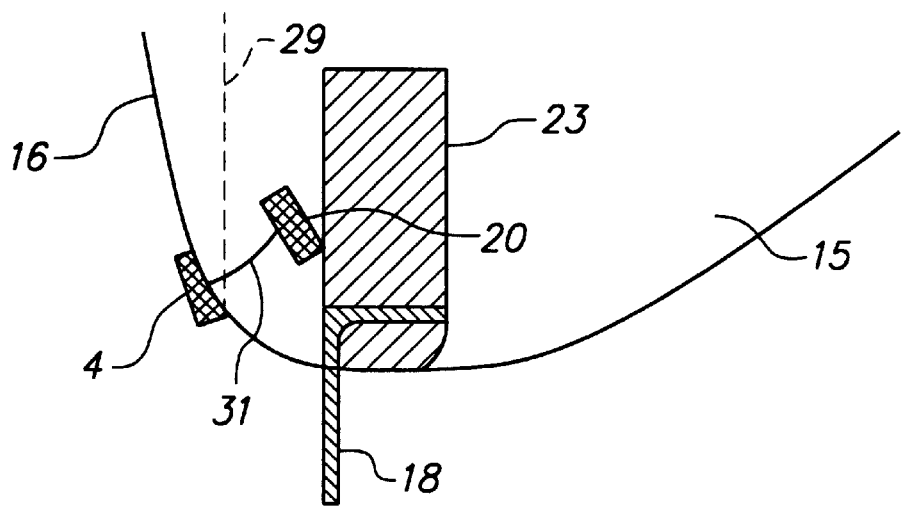
FIG. 7b is a corresponding partial side view.

FIG. 7b is a partial side view corresponding to FIG. 7a. Preferably, frontal region is substantially planar, having a radius of curvature of at least 50 cm.

A pragmatic method for locating geodesic 31 uses a length of flexible material, such as a strip of fabric or paper or a string. The flexible material is stretched on the glass surface along axis 33 and permitted to follow the curvature of the surface as it reaches transition 29, leaves frontal region 16 and enters shoulder region 17. The path traced by the material represents geodesic 31. Transducer 20 then can be attached to the glass surface on shoulder region 17 and aimed along geodesic 31. (It may be desirable to do some trial-and-error fine tuning of the positioning by measuring the signal strength with appropriate test equipment while moving transducer 20 slightly back-and-forth.)

Following this technique, a transducer was positioned on the shoulder region of a CRT. Healthy signals were observed, with amplitudes well within the dynamic range of commercial touchscreen controllers such as Elo TouchSystems (Fremont, Calif.) controller model no. E281-2310. No undesirable parasitic signals were observed.

Once the desired location for a transducer has been identified for a particular model of CRT, a template or guide can be made for easy positioning of the transducers in other CRT's of the same model. A jig can be made to hold the transducer in place while it is being bonded to the glass.

Figure 8A:
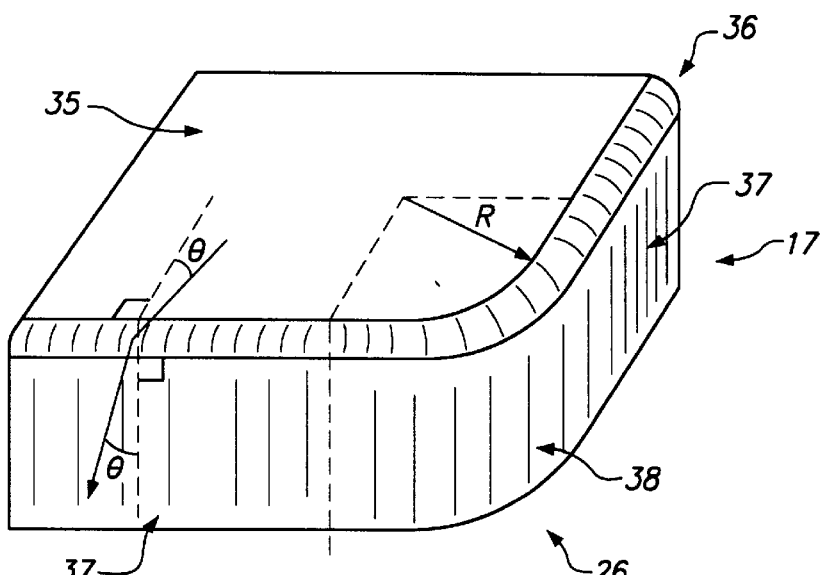
Figure 8B:
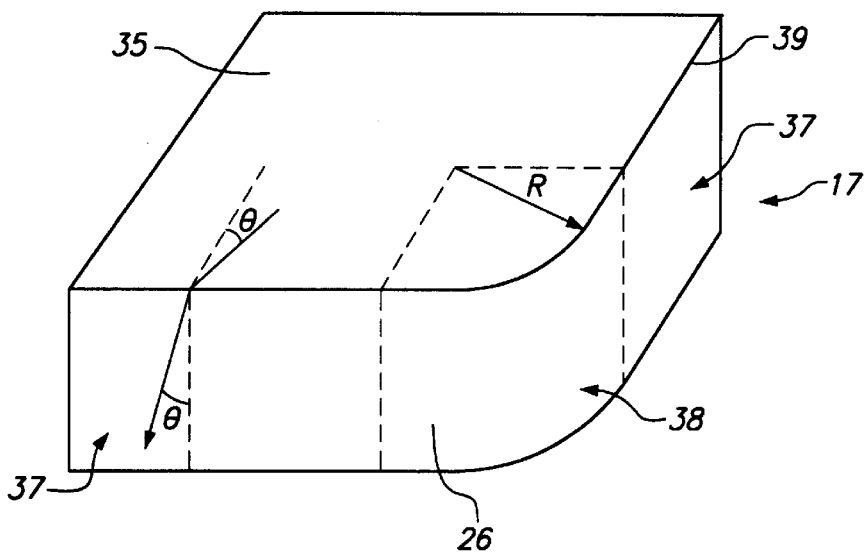

We have further discovered that corner regions 17 have a strong lensing effect, i.e., act as a lens with a very short focal length. While we do not wish to be bound by theory, we believe that the lensing and prism effects we have observed may be explained as follows. FIG. 8a shows a corner region 26/shoulder region 17 approximated by having a plane 35 represent the substantially planar frontal region surface. Shoulder region 17 is approximated by a radiused edge 36 of radius r which links plane 35 with planes 37, plane 35 being orthogonal to planes 37. At corner region 26, plane 37 is replaced by a cylindrical cross-section 38 of radius R (or, more precisely, R+r). Let $\lambda$ represent the wavelength of an acoustic wave propagating on the CRT glass, a typical value for $\lambda$ being about ½mm. FIG. 8b is a further simplified approximation, for the limiting case in which the following inequality holds:

$$R \gg r \gg \lambda$$

Then, radiused edge 36 may be replaced by a sharp edge 39. As illustrated by a representative acoustic path crossing the radiused edge in FIGS. 8a and 8b, the acoustic path's angle with respect to the edge does not change when going from surface 35 to surfaces 37 or 38.

Figure 8C:
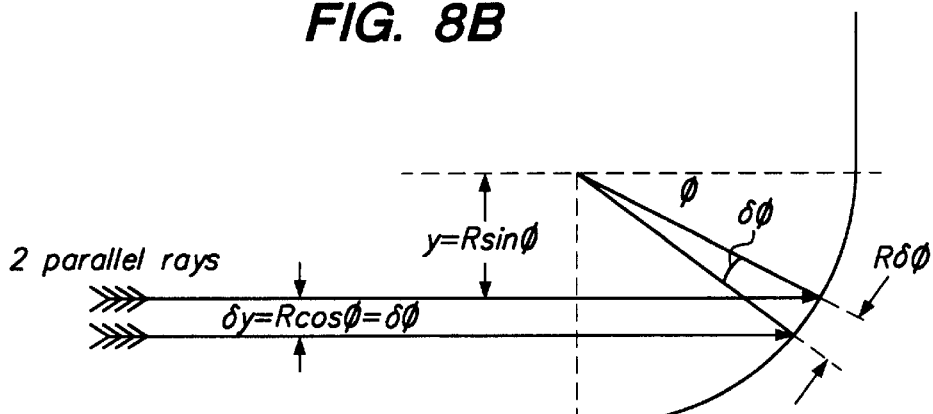
Figure 8D:
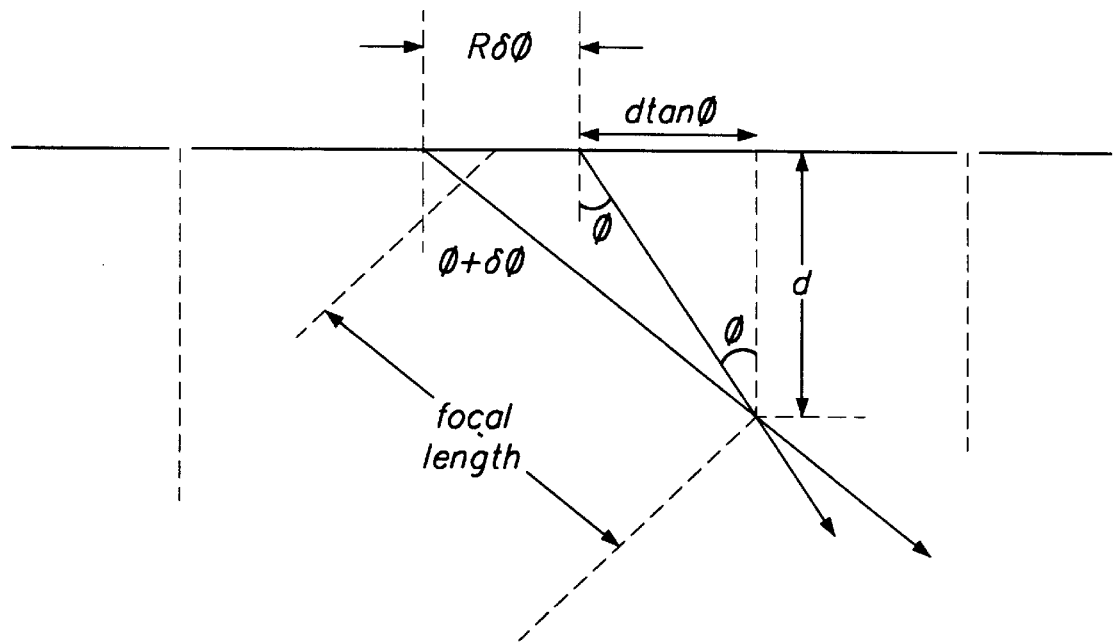

FIG. 8c illustrates two parallel acoustic paths on surface 35 that intersect the radiused edge at a corner of radius R. With respect to the center of the circular arc of radius R, the parallel paths intersect the radiused edge and angles $\phi$ and ($\phi+\delta\phi$), respectively. The distance between the intersection points is $R\delta\phi$. Then as this pair of acoustic paths continue onto (Euclidean) surface 38 they continue with angles $\phi$ and ($\phi+\delta\phi$); see FIG. 8d. Note that by traversing the corner edge, the formerly parallel acoustic paths are no longer parallel, but rather approach each other with a relative angle of $\delta\phi$. It is straight-forward geometry and mathematics to determine that the formerly parallel paths intersect at a distance f given by the equation $$f = R^* \cos(\phi)$$

The distance f is measured from the point where the geodesics cross edge 39. Hence the curved radiused edge forms a lens of focal length $R^*\cos(\phi)$. Given a typical value of R in the centimeter range, this is a very short focal length. That is, it is a strong acoustic lens. In fact, the focal length is quite comparable to the distance along geodesic 31 from the transducer to the radiused edge.

While the limiting condition R≫r is particularly amenable to mathematical analysis, this is not a requirement for a strong lensing effect. At the other extreme, namely where R≈r, the corner region approximates a section of a sphere of radius R. A sphere of radius R is also a strong lens. Its focal length measured as an arc length is $(\pi/2)$R. This can be seen by imagining a set of parallel rays intersecting a globe's equator and traveling due north. These initially parallel geodesics (great circles) come to a focus at the north pole. Whether R>>r or R≈r, we have a focal length of order R. Thus, the corner region is a strong focusing lens, independent of the precise details of its geometry.

Figure 9A:
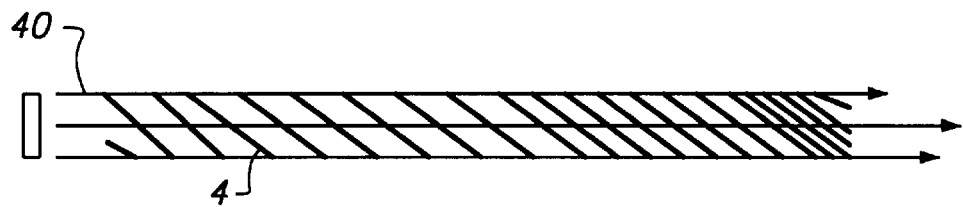
Figure 9B:
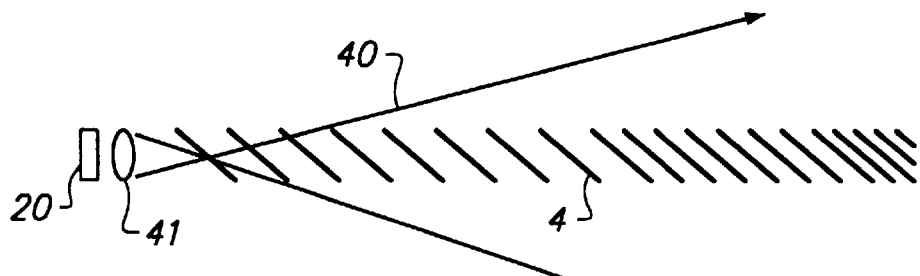

The lensing effect of corner regions 26 is generally undesirable, as can be seen by reference to FIGS. 9a and 9b. In FIG. 9a, a transducer 20 generates a parallel beam of acoustic waves 40 in the direction of a linear array of partially acoustically reflective elements 4. If, as shown in FIG. 9b, a short focal length acoustic lens 41—e.g., a corner region 26—is interposed between transducer 20 and reflective elements 4 there is a de-focusing effect, with resultant dissipation of acoustic energy. In the context of an acoustic touchscreen according to this invention, it means that it is undesirable to have the acoustic path—the geodesic—traverse a corner region 26. Referring back to FIG. 7a, it is seen that if the linear array of partially acoustically reflective elements 4 is placed near the edge of frontal region, the projection of axis 33 and geodesic 31 both traverse corner region 26. In principle, it is possible to avoid this situation by moving reflective elements 4 further towards the center of frontal region 16, in the direction of arrow B. However, such movement will reduce the proportion of frontal region 26 usable as a touch-sensitive area and is therefore commercially unattractive.

Figure 9C:
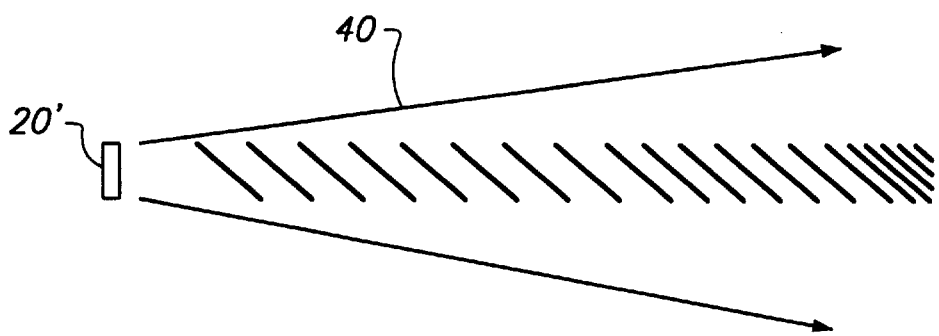

Accepting that it may be, from a practical standpoint, difficult to avoid having geodesic 31 traverse a corner region, we have discovered ways to neutralize the adverse effect of such traversal. One such way is to use a diverging transducer. Consider the situation of FIG. 9c, in which a diverging transducer 20' is used to aim a beam at a linear array of reflective elements 4 and compare that against the situation of FIG. 9a. The diverging transducer of FIG. 9c is acoustically less efficient than parallel-beam transducer 20 of FIG. 9a, delivering less acoustic energy to reflective elements 4. For this reason, diverging transducers are normally not used in acoustic touchscreens.

Figure 9D:
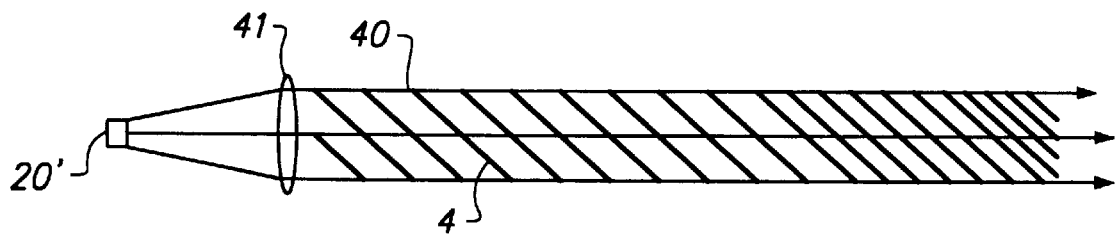

But now suppose that a short focal length acoustic lens 41 is placed between diverging transducer 20' and reflective elements 4, at a distance equal to the focal length of lens 41 (FIG. 9d). Lens 41 acts on the divergent acoustic waves 40 emitted by transducer 20' and converts it to a parallel beam. In effect, two undesirable characteristics —the defocusing effect of lens 41 and the divergent beam of transducer 20' can be made to neutralize each other. In practice, this means that if a divergent transducer is used in a touchscreen of this invention, the undesirable effect of having the geodesic traverse a corner region 26 is neutralized.

FIG. 9d illustrates the case where the negative effects of lens 41 are completely cancelled by the divergence of transducer 20'. The scope of this invention also includes cases in which this compensation is partial. Even if the divergence of transducer 20' does not completely cancel the beam spread induced by lens 41, the divergence of transducer 20' is still contributing to improved touchscreen signal amplitudes.

One method of achieving a divergent transducer is actually beneficial in another regard. Because the glass surface of the shoulder region is curved, it may be desirable to have the bottom surface of a transducer be complementarily curved, to provide a mating relationship with the curved glass surface, to provide a mechanically and acoustically superior coupling. FIG. 10 shows a wedge transducer 20 in which the bottom surface 30 of coupling wedge 22 is concave along its long axis. Such concavity may be obtained by making a transducer containing the concavity, or, in the case of the production of our prototypes, by scraping material away from an initially flat bottom surface with a metal file with a cylindrical cross-section. However, the concave cylindrical surface of coupling wedge 22 has an defocusing effect. If both the wedge and the glass are flat, the advancing acoustic wave front is flat; but if wedge is concave, there is an undesirable phase advance at the center of the acoustic wave—and consequently creating a divergence in the acoustic beam. Thus, using a transducer having a curved bottom offers the dual benefits of better mating with the curved surface of the CRT and providing a diverging transducer to offset the defocusing effect of a corner region.

If the cylindrical surface 30 of FIG. 10 has a radius of curvature $R_C$, then the diverging beam comes to a virtual focus at a distance of $$R_C \cdot \tan\theta$$

where θ is the wedge angle, i.e., the angle between the plane of the piezoelectric element and the plane tangential to surface 30 at its center. In a prototype, $R_C$ was 16 mm and θ was 64°. Hence, the diverging focal length was 32 mm.

Another type of divergent transducer is, simply, a smaller transducer. Due to diffractive effects, an acoustic beam from a transducer of narrow width tends to diverge. As is well known in optics and other fields of wave mechanics, the first node in the diffraction pattern from an aperture of width w is at an angle $\theta=\lambda/w$ where λ is the wavelength. For example, for w=6 mm and λ=½ mm, this angle is θ=1/12 radians. Normally, such transducer beam divergence would be considered undesirable. After an array of length 30 cm, this 1/12 radian beam spread corresponds to a 30 cm*(1/12)=2.5 cm beam width,—i.e. much wider than the array. However, in the context of the present invention, such divergence is beneficial for neutralizing the corner region problem. Thus, for the practice of our invention, a preferred embodiment comprises using wedge transducers wherein the width of the piezoelectric element is no greater than 6 mm, preferably no greater than 4 mm.

A smaller transducer offers another advantage: it is easier to bond to a highly curved glass surface because, when looked at in a sufficiently small point-like region, the surface may be treated as quasi-flat. It is much easier to design a 3 mm wide wedge transducer for a curved surface than a 12 mm wide wedge transducer for the same curved surface.

Yet another way to counter lost acoustic intensity due to the defocusing effect of a corner region is to select CRT's wherein the frontal region glass is acoustically a low-loss glass, such a borosilicate glass or barium-containing glass, as described in Kent, U.S. Pat. No. 5,708,461 (1998), incorporated herein by reference. The use of a low-loss glass means that less of an acoustic signal is absorbed by the glass, so that less acoustic power is required to begin with.

Those skilled in the art will understand the same transducer can be used as a transmitting or a receiving transducer. A transducer is capable of either converting an electrical signal into an acoustic wave (i.e., act as a transmitting transducer) or converting an acoustic wave into an electrical signal (i.e., operate in the reverse mode, as a receiving transducer). The same principles of physics apply. A "transmitting" and a "receiving" transducer basically differ in how they are connected to the control electronics: One of us once accidentally reversed the connections of the transmit and receive wires in an acoustic touchscreen and observed that the touchscreen still operated. Thus, in this specification the discussions have focused on a "transmitting" transducer as a matter of convenience, but they are equally applicable to a "receiving" transducer.

Those skilled in the art will understand that the angle the piezoelectric element in a wedge transducer to the surface on which it is mounted affects the efficiency of generation of an acoustic wave on the touchscreen surface. For a direct-on-CRT construction, we have used wedge transducers mounted at an angle of 64°. If there is an error and the transducer is mounted with at an angle deviating too far from the aforesaid, coherence in the acoustic wave may be lost. Preferably, the deviation should be within ±8° of 64°.

For acoustically coupling transducers to the CRT, we prefer to use a UV curing adhesive. The adhesive may also perform a gap-filling function, where the bottom surface of the transducer does not quite match the curve of the CRT glass surface. Generally an adhesive having good bonding characteristics to glass and PMMA (assuming the coupling wedge of the transducer is made of PMMA) is required. We have used Dymax® 628-T UV curable adhesive.

Preferably, the partially acoustically reflective elements are made of an organic matrix, as disclosed in Rinde et al., U.S. Pat. No. 5,883,457 (1999), incorporated herein by reference. The organic matrix may comprise a polymer including a curable composition selected from the group consisting of epoxy resin, cyanate ester resin, polyester resin, phenolic resin, bismaleimide resin, and combinations thereof. The organic matrix may include a dense filler, preferably one having a density greater than 4.0 g/cm$^3$. Examples of suitable dense fillers include powdered tungsten, tungsten trioxide, tungsten carbide, calcium carbonate, lead oxide, zinc oxide, barium sulfate, zinc sulfide, silicon dioxide, and combinations thereof. The material disclosed in the Rinde patent is especially suitable for acoustic reflective elements for direct-on-CRT touchscreens because it does not require a high temperature heating step during manufacture, compared to other acoustic reflector materials such as glass frit. A high temperature step is undesirable because it would pose a threat of damage to delicate electronic components of the CRT.

The foregoing detailed description of the invention includes passages that are chiefly or exclusively concerned with particular parts or aspects of the invention. It is to be understood that this is for clarity and convenience, that a particular feature may be relevant in more than just the passage in which it is disclosed, and that the disclosure herein includes all the appropriate combinations of information found in the different passages. Similarly, although the various figures and descriptions herein relate to specific embodiments of the invention, it is to be understood that where a specific feature is disclosed in the context of a particular figure or embodiment, such feature can also be used, to the extent appropriate, in the context of another figure or embodiment, in combination with another feature, or in the invention in general.

Further, while the present invention has been particularly described in terms of certain preferred embodiments, the invention is not limited to such preferred embodiments. Rather, the scope of the invention is defined by the appended claims.

What is claimed is:

1. An acoustic touchscreen constructed directly on a CRT, comprising:
    (a) a CRT comprising
        (i) a substantially rectangular frontal region having four corners and
        (ii) a shoulder region below the frontal region, including four corner regions at the confluences of the shoulder region and the corners of the frontal region;
    (b) a first transducer acoustically coupled to the surface of the CRT and capable of generating an acoustic signal thereon;
    (c) a first linear array of partially acoustically reflective elements associated with the first transducer, the first linear array being disposed on the frontal region, being capable of deflecting the acoustic signal across the frontal region, and having a longitudinal array axis;
    (d) a second transducer acoustically coupled to the surface of the CRT and capable of detecting the acoustic signal after the acoustic signal has traveled across the frontal region, together with perturbations thereto caused by a touch on the frontal region; and
    (e) a second linear array of partially acoustically reflective elements associated with the second transducer, the second linear array being disposed on the frontal region, being capable of deflecting the acoustic signal towards the second transducer after the acoustic signal has traveled across the frontal region, and having a longitudinal array axis;
the first and second transducers being located on the shoulder region, each positioned on and aimed along the geodesic defined by the longitudinal array axis of the respective associated linear array.

2. An acoustic touchscreen according to claim 1, wherein at least one of the first and second transducers is a wedge transducer.

3. An acoustic touchscreen according to claim 1, wherein the frontal region of the CRT comprises borosilicate glass or barium-containing glass.

4. An acoustic touchscreen according to claim 1, wherein at least one geodesic passes through a corner region.

5. An acoustic touchscreen according to claim 4, wherein the transducer positioned on and aimed along the at least one geodesic passing through a corner region is a diverging transducer.

6. An acoustic touchscreen according to claim 4, wherein the transducer positioned on and aimed along the at least one geodesic passing through a corner region is a wedge transducer having a piezoelectric element having a width no greater than 6 mm.

7. An acoustic touchscreen according to claim 4, wherein the transducer positioned on and aimed along the at least one geodesic passing through a corner region is a wedge transducer having a piezoelectric element having a width no greater than 4 mm.

8. An acoustic touchscreen according to claim 4, wherein the transducer positioned on and aimed along the at least one geodesic passing through a corner region has a bottom surface curved to mate with the curvature of the surface of the CRT at the location where the transducer is acoustically coupled to the surface of the CRT.

9. An acoustic touchscreen according to claim 4, wherein the frontal region of the CRT comprises borosilicate glass or barium-containing glass.

10. An acoustic touchscreen according to claim 1, wherein the frontal region of the CRT is substantially planar.

11. An acoustic touchscreen according to claim 1, wherein the reflective elements comprise a polymer containing a dense filler selected from the group consisting of powdered tungsten, tungsten trioxide, tungsten carbide, calcium carbonate, lead oxide, zinc oxide, barium sulfate, zinc sulfide, silicon dioxide, and combinations thereof.

12. An acoustic touchscreen constructed directly on a CRT, comprising:

(a) a CRT comprising;
   (i) a substantially rectangular frontal region having four corners and
   (ii) a shoulder region below the frontal region, including four corner regions at the confluences of the shoulder region and the corners of the frontal region;
(b) first and second transducers, each acoustically coupled to the surface of the CRT and capable of generating respective first and second acoustic signals on the surface of the CRT;
(c) first and second linear arrays of partially acoustically reflective elements associated with the first and second transducers respectively, for deflecting the first and second acoustic signals, respectively, across the frontal region;
   each of the first and second linear arrays having a respective longitudinal array axis; the first linear array being disposed along a first edge of the frontal region and the second linear array being disposed along a second edge of the frontal region substantially orthogonal to the first edge;
(d) third and fourth transducers, each acoustically coupled to the surface of the CRT; the third transducer being capable of detecting the first acoustic signal after the first acoustic signal has traveled across the frontal region, together with perturbations thereto caused by a touch on the frontal region;
   the fourth transducer being capable of detecting the second acoustic signal after the second acoustic signal has traveled across the frontal region, together with perturbations thereto caused by a touch on the frontal region; and
(e) third and fourth linear arrays of partially acoustically reflective elements associated with the third and fourth transducers respectively, for deflecting the first and second acoustic signals towards the third and fourth transducers, respectively, after the first and second acoustic signals have traveled across the frontal region; each of the third and fourth linear arrays having a respective longitudinal array axis; the third linear array being disposed along a third edge of the frontal region opposite the first edge thereof and the fourth linear array being disposed along a fourth edge of the frontal region opposite the second edge thereof;
the first, second, third and fourth transducers being located on the shoulder region, positioned on and aimed along the geodesic defined by the longitudinal array axis of the respective associated linear array.

13. An acoustic touchscreen according to claim 12, wherein at least one of the first, second, third, and fourth transducers is a wedge transducer.

14. An acoustic touchscreen according to claim 12, wherein the frontal region of the CRT comprises borosilicate glass or barium-containing glass.

15. An acoustic touchscreen according to claim 12, wherein at least one geodesic passes through a corner region.

16. An acoustic touchscreen according to claim 15, wherein the transducer positioned on and aimed along the at least one geodesic passing through a corner region is a diverging transducer.

17. An acoustic touchscreen according to claim 15, wherein the transducer positioned on and aimed along the at least one geodesic passing through a corner region is a wedge transducer having a piezoelectric element having a width no greater than 6 mm.

18. An acoustic touchscreen according to claim 15, wherein the transducer positioned on and aimed along the at least one geodesic passing through a corner region is a wedge transducer having a piezoelectric element having a width no greater than 4 mm.

19. An acoustic touchscreen according to claim 15, wherein the transducer positioned on and aimed along the at least one geodesic passing through a corner region has a bottom surface curved to mate with the curvature of the surface of the CRT at the location where the transducer is acoustically coupled to the surface of the CRT.

20. An acoustic touchscreen according to claim 15, wherein the frontal region of the CRT comprises borosilicate glass or barium-containing glass.

21. An acoustic touchscreen according to claim 12, wherein the frontal region of the CRT is substantially planar.

22. A method of constructing a touchscreen directly on a CRT, comprising the steps of:
   (a) providing a CRT comprising
      (i) a substantially rectangular frontal region having four corners and
      (ii) a shoulder region below the frontal region, including four corner regions at the confluences of the shoulder region and the corners of the frontal region;
   (b) providing plural transducers;
   (c) forming, on the frontal region, plural linear arrays of partially acoustically reflective elements, each linear array associated with a respective one of the plural transducers, each linear array having a respective longitudinal array axis;
   (d) determining, for each linear array, the geodesic defined by the respective longitudinal array axis; and
   (e) for each geodesic so determined, acoustically coupling the respective associated transducer to the surface of the CRT on the shoulder region, positioned on and aimed along the geodesic.

23. A method according to claim 22, wherein at least one of the geodesics determined in step (d) is determined by stretching, on the surface of the CRT, a length of flexible material along a longitudinal array axis and following the curvature of the surface from the frontal region to the shoulder region.

24. A method according to claim 22, wherein at least one of the plural transducers is acoustically coupled to the surface of the CRT with a UV-curable adhesive.

25. An acoustic touchscreen according to claim 22, wherein at least one of the geodesics determined in step (d) passes through a corner region.

26. A method according to claim 25, wherein the transducer positioned on and aimed along the at least one geodesic passing through a corner region is a diverging transducer.

27. A method according to claim 25, wherein the transducer positioned on and aimed along the at least one geodesic passing through a corner region is a wedge transducer having a piezoelectric element having a width no greater than 6 mm.

28. A method according to claim 25, wherein the transducer positioned on and aimed along the at least one geodesic passing through a corner region is a wedge transducer having a piezoelectric element having a width no greater than 4 mm.

29. A method according to claim 25, wherein the transducer positioned on and aimed along the at least one geodesic passing through a corner region has a bottom surface curved to mate with the curvature of the surface of the CRT at the location where the transducer is acoustically coupled to the surface of the CRT.

30. A method according to claim 25, wherein the frontal region of the CRT comprises borosilicate glass or barium-containing glass.

31. A method according to claim 22, wherein the frontal region of the CRT is substantially planar.

32. A method of situating a transducer for an acoustic touchscreen constructed directly on a CRT, comprising the steps of:
   (a) providing a CRT comprising
      (i) a substantially rectangular frontal region having four corners and
      (ii) a shoulder region below the frontal region, including four corner regions at the confluences of the shoulder region and the corners of the frontal region;
   the CRT further having formed thereon a linear array of partially acoustically reflective elements, the linear array having a longitudinal array axis;
   (b) determining the geodesic defined by the longitudinal array axis;
   (c) providing a transducer;
   (d) positioning the transducer on and aimed along the geodesic, on the surface of the CRT on the shoulder region; and
   (e) acoustically coupling the transducer to the surface of the CRT, positioned and aimed according to the preceding step.

33. A method according to claim 32, wherein the geodesic is determined by stretching on the surface of the CRT, a length of flexible material along a longitudinal array axis and following the curvature of the surface from the frontal region to the shoulder region.

34. A method according to claim 32, wherein the transducer is acoustically coupled to the surface of the CRT with a UV-curable adhesive.

35. An acoustic touchscreen according to claim 32, wherein the geodesics determined in step (b) passes through a corner region.

36. A method according to claim 35, wherein the transducer positioned on and aimed along the geodesic passing through a corner region is a diverging transducer.

37. A method according to claim 35, wherein the transducer positioned on and aimed along the geodesic passing through a corner region is a wedge transducer having a piezoelectric element having a width no greater than 6 mm.

38. A method according to claim 35, wherein the transducer positioned on and aimed along the geodesic passing through a corner region is a wedge transducer having a piezoelectric element having a width no greater than 4 mm.

39. A method according to claim 35, wherein the transducer positioned on and aimed along the geodesic passing through a corner region has a bottom surface curved to mate with the curvature of the surface of the CRT at the location where the transducer is acoustically coupled to the surface of the CRT.

40. A method according to claim 35, wherein the frontal region of the CRT comprises borosilicate glass or barium-containing glass.

41. A method according to claim 32, wherein the frontal region of the CRT is substantially planar.

42. A method according to claim 32, further comprising the step of modifying the topography of the bottom surface of the transducer to mate with the curvature of the surface of the CRT at the location at which the transducer is acoustically coupled to the surface of the CRT, prior to acoustically coupling the transducer to the surface of the CRT.

* * * * *